United States Patent
Trestain et al.

(10) Patent No.: US 12,067,330 B2
(45) Date of Patent: Aug. 20, 2024

(54) SYSTEM AND METHOD FOR CONTROLLING OUTPUT SOUND IN A LISTENING ENVIRONMENT

(71) Applicant: Harman International Industries, Incorporated, Stamford, CT (US)

(72) Inventors: Christopher Michael Trestain, Livonia, MI (US); Maxwell B Willis, Detroit, MI (US); Riley Winton, Opelika, AL (US)

(73) Assignee: Harman International Industries, Incorporated, Stamford, CT (US)

( * ) Notice: Subject to any disclaimer, the term of this patent is extended or adjusted under 35 U.S.C. 154(b) by 168 days.

(21) Appl. No.: 17/842,176

(22) Filed: Jun. 16, 2022

(65) Prior Publication Data

US 2023/0004342 A1  Jan. 5, 2023

Related U.S. Application Data

(60) Provisional application No. 63/216,979, filed on Jun. 30, 2021.

(51) Int. Cl.

| | |
|---|---|
| *H04B 1/00* | (2006.01) |
| *G06F 3/16* | (2006.01) |
| *G10L 15/22* | (2006.01) |
| *H04R 3/04* | (2006.01) |
| *H04R 3/12* | (2006.01) |
| *H04R 5/02* | (2006.01) |

(52) U.S. Cl.
CPC .............. *G06F 3/165* (2013.01); *G10L 15/22* (2013.01); *H04R 3/04* (2013.01); *H04R 3/12* (2013.01); *G10L 2015/223* (2013.01); *H04R 2499/13* (2013.01)

(58) Field of Classification Search
CPC ... G06F 3/165; G10L 15/22; G10L 2015/223; H04R 3/04; H04R 3/12; H04R 2499/13
USPC ..................................................... 381/86, 310
See application file for complete search history.

(56) References Cited

U.S. PATENT DOCUMENTS

| | | |
|---|---|---|
| 2007/0280486 A1 | 12/2007 | Buck et al. |
| 2010/0158263 A1 | 6/2010 | Katzer et al. |
| 2016/0183025 A1* | 6/2016 | Layton ..................... H04R 3/12 381/85 |
| 2017/0053636 A1 | 2/2017 | Oswald et al. |
| 2019/0303095 A1* | 10/2019 | Sohoni ..................... G10L 15/22 |

FOREIGN PATENT DOCUMENTS

EP  3338465 B1 * 10/2019  .......... G10K 11/178

* cited by examiner

*Primary Examiner* — Ammar T Hamid
(74) *Attorney, Agent, or Firm* — Angela M. Brunetti

(57) ABSTRACT

A computing device for adjusting audio output in a listening environment having a user interface to select a source, from a plurality of sources, to be played at a sound zone in a plurality of sound zones; A processor receives user input source selections to determine combined sources for the plurality of sound zones and adjust audio parameters for the sound zones having combined sources based on combined sources and individual inputs for audio settings from each sound zone. The processor applies adjusted audio parameters to a sound zone algorithm for the sound zones having combined sources, and outputs audio based on the adjusted sound zone algorithm. A designated occupant may select the sound zones to which the adjusted sound zone algorithm is to be applied.

20 Claims, 4 Drawing Sheets

SYSTEM AND METHOD FOR CONTROLLING OUTPUT SOUND IN A LISTENING ENVIRONMENT

CROSS REFERENCE

This application claims the benefit of U.S. Provisional Application Ser. No. 63/216,979, filed Jun. 30, 2021, the disclosure of which is incorporated in its entirety by reference.

TECHNICAL FIELD

The present disclosure relates to controlling sound output by speakers in a vehicle and more particularly, to adjusting sound output in vehicle sound zones.

BACKGROUND

An individual sound zone in a listening environment is intended to create individual listening zones for each occupant in the listening environment, enabling each occupant to personalize their own audio experience with limited disruption or interference from the other occupants. In each sound zone, acoustic signals corresponding to a respective audio source are taken into consideration along with the contribution of audio source signals associated with a different sound zone, to minimize the effect different sound zones have on each other.

When multiple occupants are listening to the same source, the acoustic energy from the combined sound zones is effectively doubled and may leak, or bleed, into adjacent sound zones causing a disturbance to listeners in the other sound zones. For example, if the listening environment is in a vehicle and there are four sound zones, two front seats and two rear seats. Four occupants may start out listening to acoustic signals from four separate sources. When occupants in the two rear seats decide to listen to the same source, the acoustic energy from the combined sound zones will cause a disturbance to the occupants in the two front seats.

SUMMARY

A system and method for determining combined sources selected from a plurality of sources to be played at one or more sound zones in a listening environment. User input source selections are received at a processor to determine combined sources for the plurality of sound zones. Audio parameters for the sound zones having combined sources based on combined sources and individual inputs for audio settings from each sound zone are used to adjust audio parameters for each sound zone. The processor applies adjusted audio parameters to the sound zone algorithm for the sound zones having combined sources, and outputs audio based on the adjusted sound zone algorithm. A designated occupant may select the sound zones to which the adjusted sound zone algorithm is to be applied.

Figure 1:
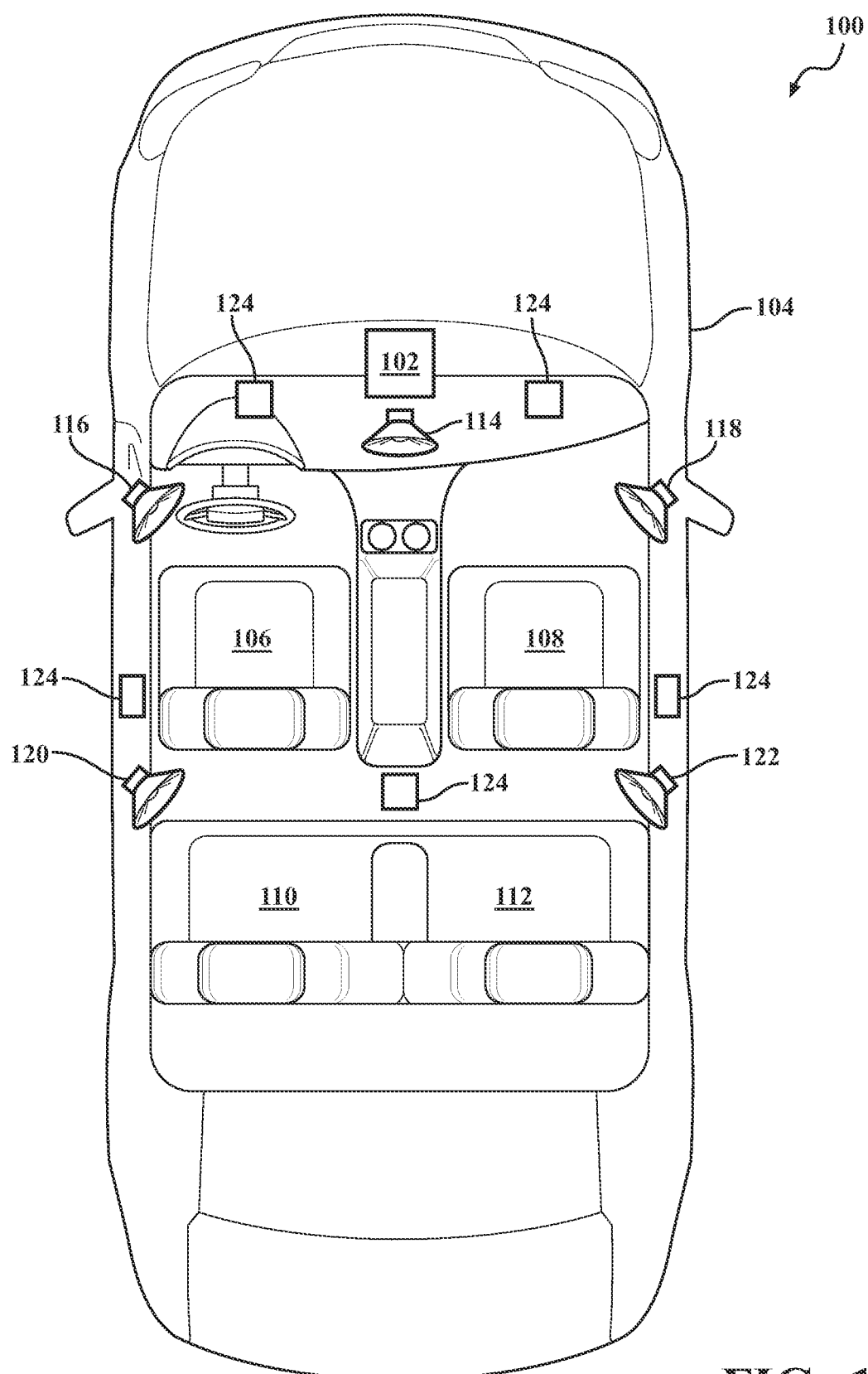
FIG. 1 is a block diagram of an example listening environment.

Elements and steps in the figures are illustrated for simplicity and clarity and have not necessarily been rendered according to any sequence. For example, steps that may be performed concurrently or in different order are illustrated in the figures to help to improve understanding of embodiments of the present disclosure.

DETAILED DESCRIPTION

While various aspects of the present disclosure are described with reference to an audio system that may be dynamically adjusted according to a user input for a listening environment in a vehicle setting. However, the present disclosure is not limited to such embodiments, and additional modifications, applications, and embodiments may be implemented without departing from the present disclosure. In the figures, like reference numbers will be used to illustrate the same components. Those skilled in the art will recognize that the various components set forth herein may be altered without varying from the scope of the present disclosure.

Many sounds, like navigation prompts and vehicle alerts are only relevant to the driver. Each occupant in the vehicle may want to control their own volume. Phone calls may be directed to one occupant, while everyone else continues to listen to media from their own source. For example, each occupant in the vehicle may select a sound source, reducing noise from surrounding occupants. This occurs without the use of headphones which keeps occupants in communication with each other, while still enjoying media from their own selected source. However, when multiple occupants are listening to the same source, acoustic energy from the combined sound zones is effectively doubled and may leak, or bleed, into adjacent sound zones causing a disturbance to occupants in the other sound zones. There is a need to prevent bleed from combined sound zones.

Further, if one or more seats in the listening environment is unoccupied, any leakage present in unoccupied seats is of no concern. Therefore, unweighting priority of unoccupied seats prioritizes sound zone control for the occupied seats, resulting in improved separation, or isolation, of each occupied sound zone.

The inventive subject matter normalizes any combination of media sources in terms of perceptual loudness. For example, when rear occupants are sharing a media source, the source level of the combined media source may be turned down, which includes reducing the gain, or level, of the rear passenger and driver side seat source. Additionally, other audio processing may occur, for example, equalization, dynamics/compression, or other types of digital signal processing, as needed to provide a consistent listening experience for each occupant in the listening environment.

Further, using occupant detection, an audio processing system has knowledge of which seats or zones are physically occupied. When one or more seats are unoccupied, core sound algorithms can optimize a filter set to promote an improved listening experience for occupants, and disregarding sound zones that are unoccupied.

FIG. 1 is an example listening environment 100 having an audio, or sound, processing system 102 that is configured to carry out instructions generated in response to user inputs from a plurality of sound zones. In the example shown in FIG. 1, the listening environment 100 is a vehicle 104 that includes a sound zone 106 coinciding with a driver occupant seat, a sound zone 108 coinciding with a front passenger occupant seat, a sound zone 110 coinciding with a driver-side rear occupant seat, and a sound zone 112, coinciding with a passenger-side rear occupant seat.

In the example shown in FIG. 1, the vehicle 102 has, for example, a front center speaker 114, a driver-side front speaker 116, a passenger-side front speaker 118, a driver-side rear speaker 120 and a passenger-side rear speaker 122. The number, location, type of speakers in FIG. 1 is for example purposes only and other speaker sets may be used. For example, a subwoofer or other drivers. The vehicle may also include one or more sensors 124, such as microphones, cameras, weight sensors, millimeter wave sensors to name just a few. The sensors 124 are strategically located throughout the vehicle interior and may be used, among other purposes, to detect occupants and their locations within the listening environment. While a particular example configuration is shown in FIG. 1, other configurations may be used without departing from the scope of the inventive subject matter. For example, the listening environment may be a larger vehicle with multiple rows of rear seats, it may be another type of vehicle such as a boat, or it may be a room such as a living room or theater. The audio processing system 102 supports the use of multiple audio sources (not shown in FIG. 1), such as radios, CDs, DVDs, mobile devices, etc. The audio processing system 102 receives audio signals from the sources, processes the audio signals, and outputs the audio signals to one or more speakers in the listening environment.

Figure 2:
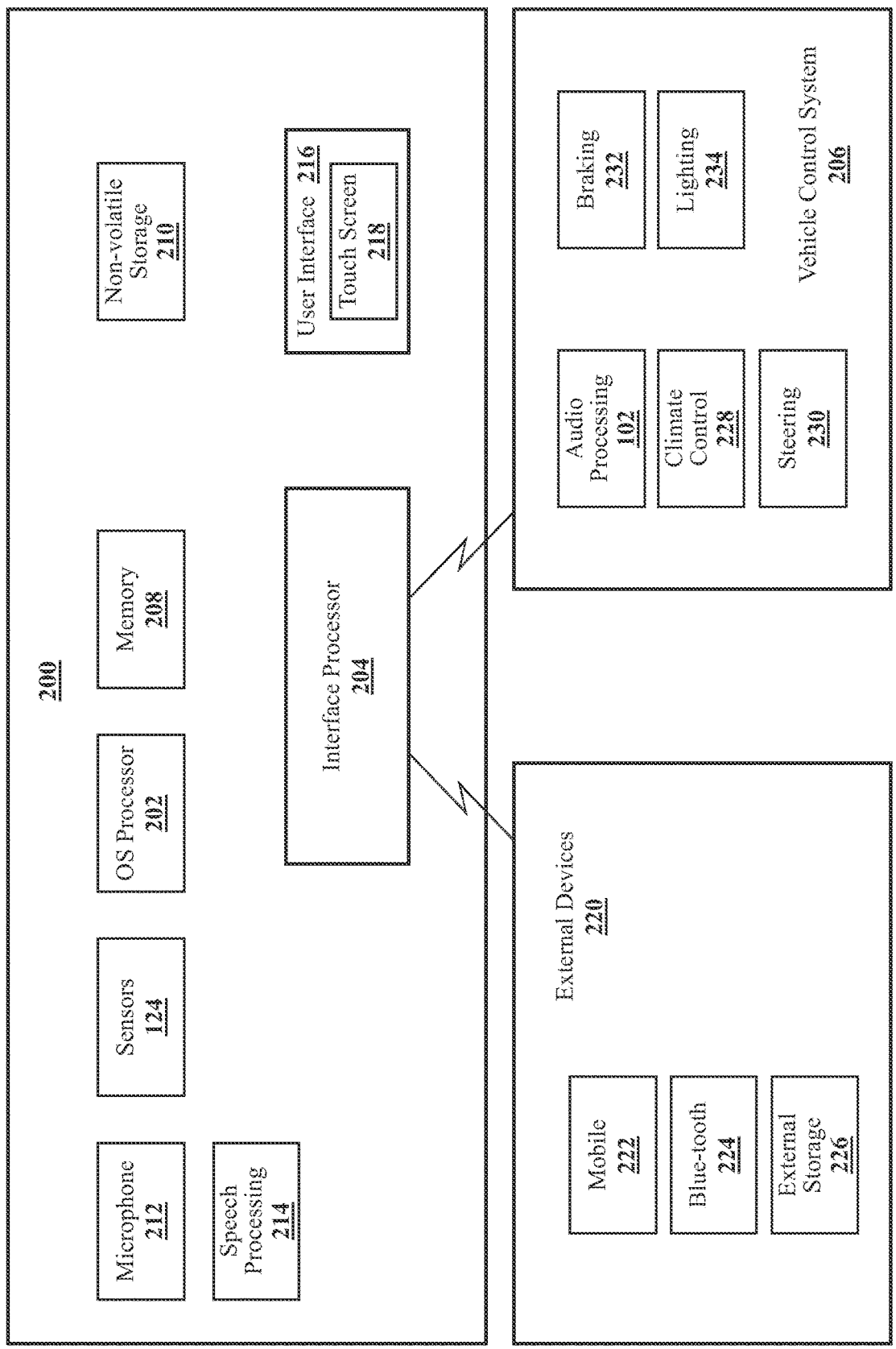
FIG. 2 is a block diagram of a computing system.

FIG. 2 is a block diagram of a computing system 200 in the listening environment that may perform one or more of the methods described later herein. In the present example, the computing system is an in-vehicle computing system 200 that is part of a vehicle infotainment system configured to provide media content to occupants in each sound zone. The source of media content may be selected by each occupant in each sound zone. The infotainment system may include, or be coupled to, various vehicle systems and subsystems. The in-vehicle computing system 200 may include one or more processors, including an operating system processor 202, an interface processor 204 that communicates with a vehicle control system 206, including the audio processing system 102.

The in-vehicle computing system 200 may include volatile memory 208 and a non-volatile storage medium 210 to store data, such as instructions executable by processors 202, 204, 206, and 102. The in-vehicle computing system 200 may include a microphone 212 to receive voice commands from the occupants. The microphone 212 may also measure ambient noise for detecting occupants and determine their location in the vehicle. The sensor data collected by the microphone is used to determine whether audio from speakers of the vehicle is tuned in accordance with an acoustic environment for detecting occupants, their locations in the vehicle, and their selected source of media.

The in-vehicle computing system 200 may include a speech processing unit 214 to process voice commands detected by the microphone 212 and determine the occupants' locations in the vehicle. The in-vehicle computing system 200 may also include one or more sensors 124, such as cameras or weight sensors, to receive inputs from occupants and to detect occupants and determined their locations in the vehicle.

The in-vehicle computing system 200 may also include a user interface 216, that may include a display, or touch screen 218, for receiving and communicating user settings. Additionally, or alternatively, external devices 220, wired or wireless, may communicate with the in-vehicle computing system 200 as a means for occupants to input selections to the in-vehicle computing system 200. External devices 220 may include, but are not limited to, a mobile device 222, a blue-tooth device 224, an external storage device 226 such as a USB drive, a wearable device, a tablet, etc. The external device 220 may function as a user interface and may also be used to detect occupants and their locations in the vehicle. Additionally, the external device 220 may be a source of media, to be discussed later herein.

The in-vehicle computing system 200 is in communication with the vehicle control system 206 which includes, but is not limited to the audio system 102, a climate control system, 228 and various vehicle controls such as steering 230, braking 232 and lighting 234 to name a few. Control signals from the various vehicle control systems may also control audio output at one or more speakers of the vehicle's audio system to adjust audio output characteristics, such as volume, equalization, audio image (e.g., the configuration of the audio signals to produce audio output that appears to a user to originate from one or more defined locations), audio distribution among a plurality of speakers, and dynamics, including range compression and volume limiting. A source selection matrix is designed, such that, each media source is routed to the corresponding sound zone. A sound zone algorithm for each sound zone ensures the resulting acoustic signal corresponds to the audio source signal associated with the same sound zone, and the contribution of audio source signals associated with a different sound zone is minimized. The directivity of a loudspeaker associated with a specific sound zone is such that the resulting acoustic signal level generated by the speaker is higher than that in the other sound zones. This is typically accomplished by decoupling the individual sound zones using crosstalk cancellation methods.

A vehicle occupant may use the user interface 216 to provide inputs to the vehicle audio system 102 thereby selecting a media source and adjusting sound preferences with respect to the sound zone of their location within the listening environment. Preferences include, but are not limited to, selecting/configuring a virtual sound space and selecting sound qualities for sound output in the sound zone. The audio processing system 102 carries out the instructions generated in response to inputs at the user interface to adjust audio parameters for sound output at the speakers. Sound output by the speakers is adjusted to meet the settings associated with the sound zone. This could also be done using seat-specific speakers with no crosstalk cancellation.

Figure 3:
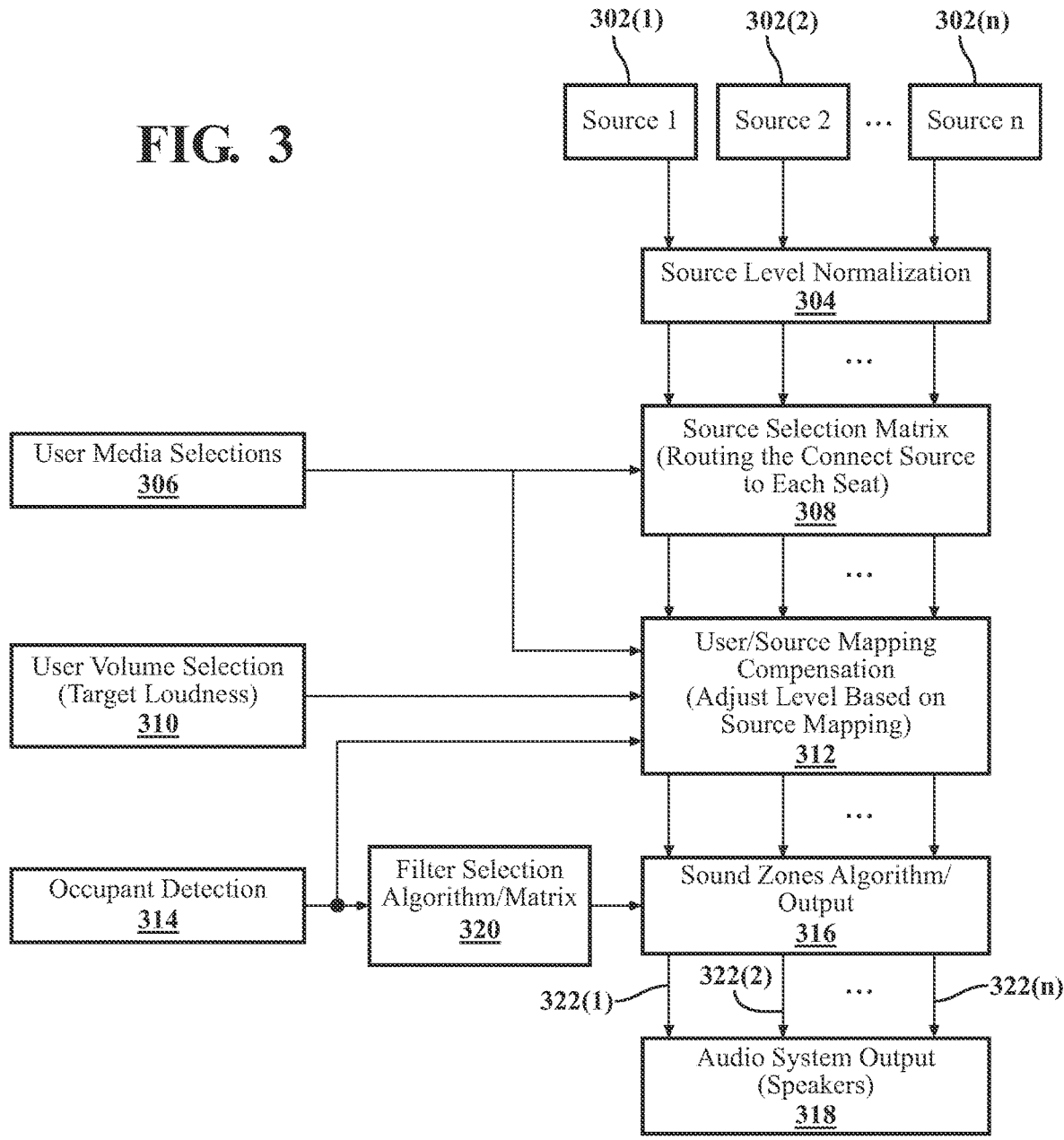
FIG. 3 is a block diagram of a system of the inventive subject matter.

When multiple people are listening to the same source, the audio may bleed into other sound zones. FIG. 3 is a block diagram of a system 300 for minimizing bleed from sound zones having the same source into surrounding sound zones. A plurality of sources 302(1) to 302(n) are available for selection by any one of the occupants in any one of the sound zones in the listening environment. The sources are sources of media that are output by the audio system. The sources 302(1)-302(n) may include, but are not limited to, a vehicle infotainment system, a radio, a CD player, a DVD player, a mobile device (i.e., a smart phone, a tablet, a laptop, portable media player, etc.), a telephone, a navigation device, a streaming device, a microphone, a USB drive, or other device wirelessly connected to the vehicle infotainment system to be played back by the audio system. Sources 302(1)-302(n) communicate with the in-vehicle computing system by way of the interface processor and/or the external device interface.

A source level normalization block 304 includes instructions and control signals to bring audio signals from the sources 302(1) to 302(n) to an equal perceptual loudness level. Occupant media selections 306 of selected sources 302(1)-302(n) are provided to a source selection matrix 308. Based on the occupant's selection 308 made at the user interface, the source selection matrix 308 routes each source to the corresponding sound zone.

The occupant may input one or more settings 310, such as a volume setting, dynamics, equalization, gain, and tone controls including bass, midrange and treble, for example. The occupants communicate preferences and selections for the settings by way of the user interface which may include the display of an in-vehicle infotainment system or a display of a mobile device, or other mobile device that is in communication with the in-vehicle computing system, by way of the interface processor and/or the external device interface.

A user/source mapping compensation block 312 uses source selection information, user media selection information, and user volume selection information to determine whether multiple occupants have selected, and are listening to, the same source. Additionally, in one or more embodiments, occupants may be detected 314 to identify relevant sound zones for the purpose of mapping compensation and sound zone algorithm selection and this information may also be used by the user/source mapping compensation block 312 to be discussed later herein.

The user/source mapping compensation block 312 adjusts the audio signal output for sound zones having the same media source selection to avoid bleeding into other sound zones. For example, a gain adjustment may be made to the audio signal being output at combined sound zones, combined meaning the occupants have selected the same media source to be played at their respective sound zone. Additionally, or alternatively, processing may be applied to adjust equalization, dynamics, compression, or other types of audio parameters, to prevent audio being played at combined sound zones from bleeding into other sound zones in the listening environment.

For example, referring to FIG. 1, occupants in the rear driver-side seat and the rear passenger-side seat may select the same source. The combined sound zones 110, 112 in the rear part of the listening environment need to be minimized so the audio being played does not affect the audio being played from sources selected by occupants in the other two sound zones 106, 108 at the front of the listening environment. Referring again to FIG. 3, the user and source mapping compensation block 312 adjusts audio parameters so that a level for combined zones is set to prevent bleeding into the other sound zones.

A sound zone algorithm output block 316 uses the settings from the source mapping compensation block 312 to select and apply an algorithm for each sound zone that is output 318 at the speakers in the audio system. To select and apply the proper algorithm for each sound zone, the sound zone algorithm output block 316 also receives information from a filter selection algorithm matrix 320. The filter selection algorithm matrix uses information from occupant detection 314 to identify sound zones that are occupied by listeners. The filter selection algorithm matrix 320 identifies and selects a filter set to be applied to each sound zone by the sound zone algorithm output block 316.

Occupant detection block 314 allows the filter selection algorithm block 320 to optimize algorithm selection when certain sound zones are unoccupied. Occupant detection block 314 uses information from vehicle sensors and/or user input devices to determine which sound zones are occupied. For example, sound zones that are occupied may be prioritized, while sound zones that are unoccupied may be disregarded, when filter selection algorithms are being determined at the filter selection algorithm matrix 320. Additionally, occupant detection block 314 may also provide information about occupant locations to be used by the user/source mapping compensation block 312 for mapping occupant selections of a source to the appropriate sound zone.

A sound zone algorithm output block 316 applies the selections from the filter selection algorithm matrix 320 and applies signals, filters, inverse filters, and transfer functions, that are adjusted by the source mapping compensation block 312 to the audio signal that is to be output 318 at loudspeakers 322(1)-322(n) to compensate for combined sound zones, i.e., sound zones that have the same source, thereby preventing audio from the combined sound zones from bleeding into the other sound zones.

Figure 4:
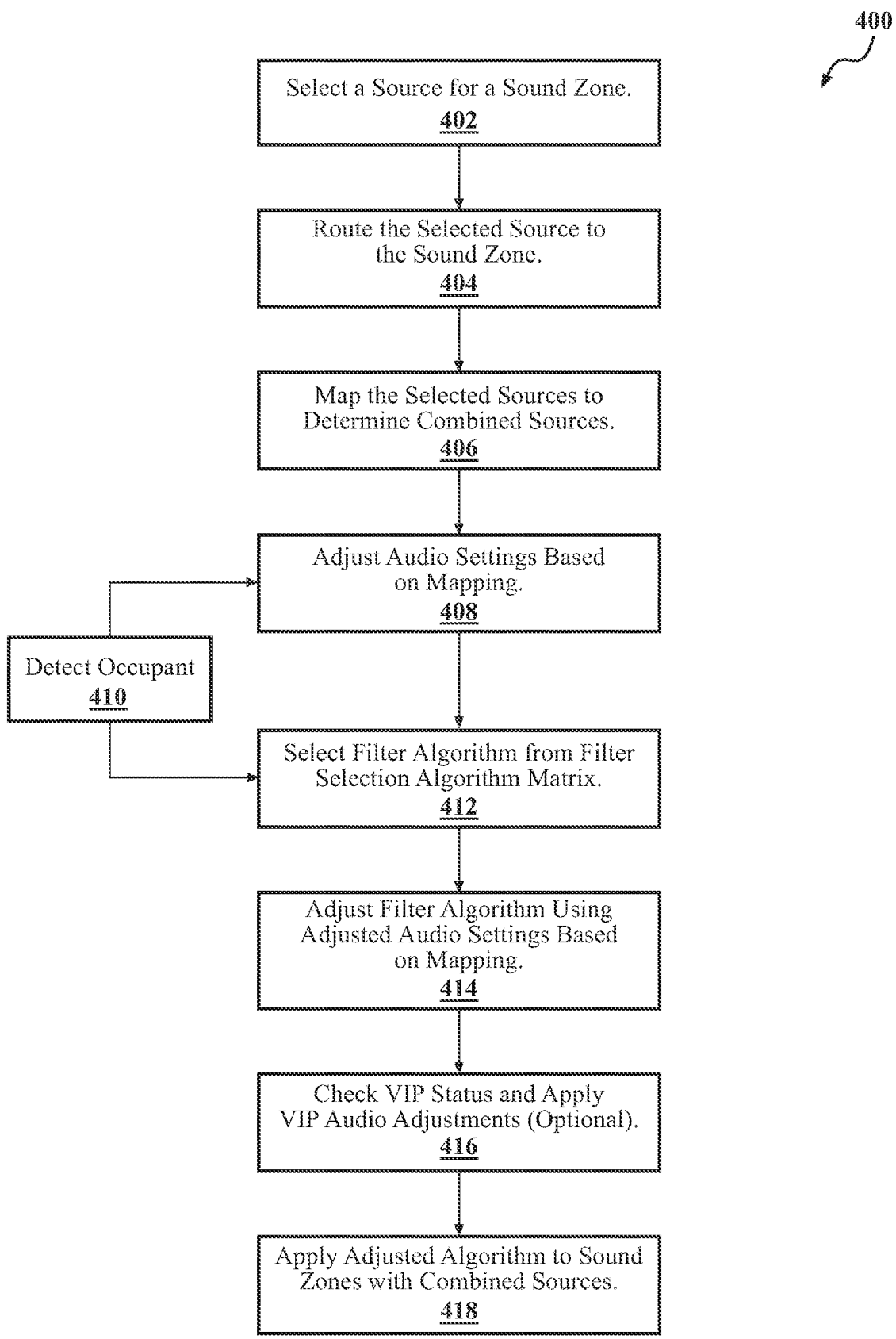
FIG. 4 is a flow diagram of a method of the inventive subject matter.

FIG. 4 is a flow diagram of a method for adjusting audio output in at least two sound zones having a same media source selected to prevent the audio from bleeding into other sound zones in a listening environment. The method is carried out by executing instructions with one or more processors in combination with hardware devices, such as storage devices, memory, interfaces, sensors, switches, actuators, etc. The storage devices have a non-transitory computer-readable storage medium, configured to execute the instructions stored on the non-transitory computer-readable storage medium. At 402, receiving a user input indicative of selecting a source for a sound zone. The user input selecting the source is made by way of the user interface, which may be, for example, an in-vehicle display, a mobile device, or an external device.

At 404, the selected source is routed to the sound zone. Because there are a plurality of sources and a plurality of sound zones, at 406, the selected sources are mapped to the sound zones to determine if there are any combined sources. Combined sources are defined to be sources that have been selected by occupants at one or more sound zones. The occupants in respective sound zones have selected the same source for playback, thereby combining the audio output being played back at sound zones for the combined sources.

At 408, audio parameters are adjusted, based on the mapped sound zones and combined sources, to reduce or eliminate bleed for other sound zones. Other sound zones are sound zones that do not have the same source for media playback selected. Adjustments to the audio parameters, for example, may include a basic gain adjustment to the audio output at the sound zones having combined sources, thereby reducing the audio being output at the combined sources from affecting audio output at the surrounding sound zones. Other adjustments to the audio parameters may be made, including but not limited to equalization, dynamics, compression, or other types of signal processing.

In one or more embodiments, at 410 an occupant is detected in one or more sound zones. During 408, if a sound zone does not have an occupant detected, the step of adjusting audio settings based on mapping may take this into consideration. Only sound zones that have an occupant detected will be considered and the step of adjusting audio settings will prioritize audio adjustments only for sound zones that are occupied.

Information about occupants detected 410 in each sound zone is also received at 412. At 412, based on the adjusted audio settings and occupied sound zones, a filter algorithm is selected from a filter selection algorithm matrix. Knowledge of which sound zones are occupied allows for an optimized filter set to be selected. The selected filter set is applied 414 to the standard core algorithm for sound zones.

This algorithm is typically known to be a MIMO control signal block. The standard sound zone algorithm is modified by the selected filter set to modify the algorithm as it applies to each sound zone. At 418 the adjusted algorithm is applied to occupied sound zones, and more particularly to occupied sound zones having combined sources.

In one or more embodiments, one occupant may be designated with the capability to manually prioritize the sound zones outside of source selection by occupants. This designated occupant may be considered a VIP and is allowed to make selections, by way of the user interface, that augments the audio experience in a sound zone of their selection, even if their selections may be detrimental to an experience for listeners in other sound zones of the listening environment. The VIP may be assigned at any point and may be changed at any point. Assigning a VIP is optional. Therefore, in the event a VIP status is assigned to any one of the listener positions, VIP status is checked and the VIP audio settings are adjusted accordingly before the adjusted algorithm is applied in step 418.

In the foregoing specification, the present disclosure has been described with reference to specific exemplary embodiments. The specification and figures are illustrative, rather than restrictive, and modifications are intended to be included within the scope of the present disclosure. Accordingly, the scope of the present disclosure should be determined by the claims and their legal equivalents rather than merely by the examples described.

For example, the steps recited in any method or process claims may be executed in any order, may be executed repeatedly, and are not limited to the specific order presented in the claims. Additionally, the components and/or elements recited in any apparatus claims may be assembled or otherwise operationally configured in a variety of permutations and are accordingly not limited to the specific configuration recited in the claims. Any method or process described may be carried out by executing instructions with one or more devices, such as a processor or controller, memory (including non-transitory), sensors, network interfaces, antennas, switches, actuators to name just a few examples.

Benefits, other advantages, and solutions to problems have been described above for embodiments; however, any benefit, advantage, solution to problem or any element that may cause any particular benefit, advantage, or solution to occur or to become more pronounced are not to be construed as critical, required, or essential features or components of any or all the claims.

The terms "comprise", "comprises", "comprising", "having", "including", "includes" or any variation thereof, are intended to reference a non-exclusive inclusion, such that a process, method, article, composition, or apparatus that comprises a list of elements does not include only those elements recited but may also include other elements not expressly listed or inherent to such process, method, article, composition or apparatus. Other combinations and/or modifications of the above-described structures, arrangements, applications, proportions, elements, materials, or components used in the practice of the present disclosure, in addition to those not specifically recited, may be varied, or otherwise particularly adapted to specific environments, manufacturing specifications, design parameters or other operating requirements without departing from the general principles of the same.

What is claimed is:

1. A computing device for adjusting audio output in a listening environment, the computing device comprising:
    a user interface to select a source, from a plurality of sources, to be played at a sound zone in a plurality of sound zones;
    a processor; and
    a storage device storing instructions executable by the processor to:
        receive user input source selections;
        map, in a user/source mapping compensation matrix, the source selections to respective sound zones;
        determine, from the user/source mapping compensation matrix, combined sources;
        adjust audio parameters for the sound zones having combined sources;
        apply adjusted audio parameters to a sound zone algorithm for the sound zones having combined sources; and
        output audio based on the adjusted sound zone algorithm.

2. The computing device as claimed in claim 1, further comprising means for detecting an occupant in each sound zone of the plurality of sound zones and wherein the storage device further comprises instructions executable by the processor to:
    select a filter set, from a filter selection matrix, for occupied sound zones; and
    apply the selected filter set to the sound zone algorithm.

3. The computing device as claimed in claim 2, wherein the means for detecting an occupant in each sound zone is selected from the group consisting of: a microphone receiving voice commands from one or more occupants, a millimeter wave sensor, a weight sensor, a sensor for measuring ambient noise in the listening environment, a camera, and the user interface.

4. The computing device as claimed in claim 3, wherein the user interface is an external device.

5. The computing device as claimed in claim 2, wherein a designated occupant selects a priority for the occupied sound zones and the selected filter is applied to the sound zone algorithm based on the priority selected by the designated occupant.

6. A method for adjusting audio output in a listening environment, the method comprising:
    receiving, at a user interface, a source selected from a plurality of sources, to be played at one or more sound zones in the listening environment;
    in response to the source selections, mapping, in a user/source mapping compensation matrix, each source to each sound zone;
    determining, from the user/source mapping compensation matrix, combined sources;
    adjusting audio parameters in sound zones having combined sources; and
    transmitting the adjusted audio parameters to an audio system for playback at the sound zones having combined sources.

7. The method as claimed in claim 6, further comprising the steps of:
    detecting an occupant in each sound zone; and
    wherein the step of determining combined sources further comprises combining sources for sound zones that the same source selected and an occupant detected therein.

8. The method as claimed in claim 7, wherein the step of detecting an occupant in each sound zone further comprises receiving sensor data that is indicative of an occupant in the sound zone.

9. The method as claimed in claim 7, wherein the step of receiving sensor data further comprises receiving sensor data from at least one of a microphone, a millimeter wave sensor, a weight sensor, a camera, and the user interface.

10. The method as claimed in claim 9, wherein the sensor data received from the microphone is processed by a speech recognition device to receive voice commands to detect an occupant in the sound zone.

11. The method as claimed in claim 9, wherein the user interface is an external device.

12. The method as claimed in claim 6, wherein the step of transmitting the adjusted audio parameters further comprises the step of a designated occupant selecting the sound zones to which the adjusted audio parameters will be transmitted.

13. An in-vehicle computing system of a vehicle, comprising:
　an audio processor;
　a user interface in communication with the audio processor, the user interface communicates a source selected from a plurality of sources for which audio is to be played at a sound zone in a plurality of sound zones in the vehicle;
　a storage device storing instructions executable by the audio processor to:
　　receive user input source selections;
　　map, in a user/source mapping compensation matrix, the source selections to respective sound zones;
　　determine, from the user/source mapping compensation matrix, combined sources;
　　adjust audio parameters for the sound zones having combined sources;
　　apply adjusted audio parameters to a sound zone algorithm for the sound zones having combined sources; and
　　output audio based on the adjusted sound zone algorithm.

14. The in-vehicle computing system as claimed in claim 13, further comprising:
　an occupant detection system for detecting an occupant in each sound zone of the plurality of sound zones; and
　wherein the storage device further comprises instructions executable by the processor to:
　　select a filter set, from a filter selection matrix, for occupied sound zones; and
　　apply the selected filter set to the sound zone algorithm.

15. The in-vehicle computing device as claimed in claim 14, wherein the occupant detection system further comprises a microphone receiving voice commands from one or more occupants.

16. The in-vehicle computing device as claimed in claim 15, further comprising a speech recognition device to process the voice commands from the one or more occupants and determine a respective sound zone for the one or more occupants.

17. The in-vehicle computing device as claimed in claim 14, wherein the occupant detection system further comprises a camera.

18. The in-vehicle computing device as claimed in claim 14, wherein the occupant detection system further comprises the user interface.

19. The in-vehicle computing device as claimed in claim 18, wherein the user interface is an external device.

20. The in-vehicle computing device as claimed in claim 14, wherein a designated occupant selects a priority for occupied sound zones and the selected filter is applied to the sound zone algorithm based on the selected priority.

* * * * *